United States Patent [19]

Horikawa et al.

[11] Patent Number: 4,775,721

[45] Date of Patent: Oct. 4, 1988

[54] PROCESS FOR PRODUCING POLYAMIDE BLOCK COPOLYMER

[75] Inventors: Jiro Horikawa, Osaka; Masahiro Niwano, Ehime; Takenobu Kanazawa, Shizuoka, all of Japan

[73] Assignee: Sumimoto Chemical Company, Limited, Osaka, Japan

[21] Appl. No.: 41,386

[22] Filed: Apr. 23, 1987

[30] Foreign Application Priority Data

Apr. 23, 1986 [JP] Japan .................. 61-94137
Mar. 9, 1987 [JP] Japan .................. 62-53517

[51] Int. Cl.$^4$ ............... C08G 69/18; C08G 77/54
[52] U.S. Cl. .................. 525/183; 525/184; 525/408; 525/437; 525/474
[58] Field of Search .............. 525/184, 63, 65, 183, 525/419, 437, 474, 523, 408

[56] References Cited

U.S. PATENT DOCUMENTS

| | | | |
|---|---|---|---|
| 3,826,785 | 7/1974 | Bruant .................. | 525/184 |
| 3,887,643 | 6/1975 | Selman .................. | 525/184 |
| 4,485,213 | 11/1984 | Matsuo et al. ........... | 525/184 |
| 4,590,243 | 5/1986 | Gabbert et al. .......... | 525/184 |
| 4,645,800 | 2/1987 | Gabbert et al. .......... | 525/184 |
| 4,649,177 | 3/1987 | Gabbert et al. .......... | 525/184 |

FOREIGN PATENT DOCUMENTS

| | | |
|---|---|---|
| 0067693 | 12/1982 | European Pat. Off. . |
| 0156079 | 10/1985 | European Pat. Off. . |
| 1495680 | 11/1969 | Fed. Rep. of Germany . |
| 2335833 | 1/1974 | Fed. Rep. of Germany . |

OTHER PUBLICATIONS

European Search Report, EP 87 30 3547.
Chemical Abstracts, vol. 81, No. 24, Dec. 16, 1974, pp. 53–54.
Abstract Japanese Patent Appl. No. 58-145580 (vol. 9, No. 237(C-305) (1960) Sep. 24, 1985.
Abstract Japanese Patent Appl. No. 57-49326 (vol. 7, No. 289 (C-202) (1434) Dec. 23, 1983.

*Primary Examiner*—Allan M. Lieberman
*Attorney, Agent, or Firm*—Sughrue, Mion, Zinn, Macpeak & Seas

[57] ABSTRACT

A process for producing a polyamide block copolymer is disclosed, which comprises suspension polymerizing a lactam in an organic suspending medium in the presence of an anionic polymerization catalyst and a polymer activator. The polyamide block copolymer obtained has a granular or powdery form easy to handle.

5 Claims, No Drawings

PROCESS FOR PRODUCING POLYAMIDE BLOCK COPOLYMER

FIELD OF THE INVENTION

This invention relates to a process for producing polyamides widely employed as so-called nylon, and more particularly to a process for producing a polyamide block copolymer by suspension polymerization of a lactam in an organic suspending medium.

BACKGROUND OF THE INVENTION

Polyamides are generally produced by ring open polymerization of lactams effected by melt bulk polymerization, solid bulk polymerization, or suspension polymerization or precipitation polymerization using organic media.

According to the suspension polymerization technique, a lactam is suspended in an organic suspending medium in which the lactam is insoluble or sparingly soluble in the presence of a suspending agent and polymerized using an anionic polymerization catalyst and a polymerization activator.

Japanese Patent Publication No. 10636/61 discloses a process for polymerizing various lactams suspended in a paraffin oil or a silicone oil with the aid of a polyaminocaproic acid powder or talc as a suspending agent in the presence of an alkaline catalyst and a polymerization activator such as an isocyanate, a carbodiimide, a cyanimide, etc.

Japanese Patent Publication No. 42719/73 discloses a process for polymerizing 2-pyrrolidone using a nonionic surface active agent as a suspending agent and N-acetylpyrrolidone, isocyanates, carbon dioxide, etc. as a polymerization initiator.

Japanese Patent Publication No. 4837/74 discloses a process using a homo- or copolymer of an olefin or diolefin having a molecular weight of at least 1500 as a suspending agent.

Processes for producing polyamide block copolymers by the solid bulk polymerization technique are disclosed, e.g., in U.S. Pat. Nos. 3,862,262 and 4,540,515, European Pat. Nos. 67,693 and 147,051, etc.

Homopolymers of lactams obtained by the conventional suspension polymerization techniques were unsatisfactory in flexibility, impact resistance, and the like. The bulk polymerization techniques provide copolymers but require extra special devices or operations for obtaining copolymers in the form of granules or powders easy to handle.

SUMMARY OF THE INVENTION

An object of this invention is to provide a process for producing a modified lactam copolymer in the form of granules or powders easy to handle.

The process for producing a polyamide block copolymer according to the present invention comprises suspension polymerizing a lactam in an organic suspending medium in the presence of an anionic polymerization catalyst and a polymer activator.

DETAILED DESCRIPTION OF THE INVENTION

The lactam which can be used in the present invention includes 2-pyrrolidone, ε-caprolactam, enantholactam, laurolactam, etc.

The organic suspending medium which can be used in the present invention is a medium in which the lactam is insoluble or sparingly soluble and can be selected from those which cause phase separation when mixed with an approximately equivalent amount of the lactam at temperature above the melting point of the lactam.

Such an organic suspending medium includes aliphatic or alicyclic hydrocarbons. Preferred are aliphatic or alicyclic hydrocarbons having from 6 to 16 carbon atoms. Specific examples of these media are n-hexane, n-heptane, n-octane, isooctane, cyclohexane, n-dodecane, decahydronaphthalene, liquid paraffin, and mixtures thereof.

It is desirable that a suspending agent be present in the organic suspending medium so as to maintain suspension stability and to produce polyamide block copolymers having a uniform particle size.

The suspending agent to be used suitably includes organic compounds having separate compatibility parts with the organic suspending medium and the lactam, respectively. In particular, polymers having a molecular weight of from 500 to 10,000,000 and preferably from 5,000 to 1,000,000 are preferred. If the molecular weight is less than 500, the suspending capacity is insufficient. If it exceeds 10,000,000, dissolution or uniform dispersion of the suspending agent in the organic suspending medium takes a long period of time and, hence, such is not preferred. The compatibility part with the lactam is a part which has polarity and contains basic nitrogen or a carboxyl group.

The compatibility part with the organic suspending medium is a part which has no polarity or weak polarity. Specific examples include a repeating unit part of an olefin, e.g., ethylene, propylene, etc., a repeating unit part of a diene, e.g., butadiene, isoprene, etc., or a copolymer part thereof, and a repeating unit part of an ester between a (meth)acrylic acid and an aliphatic or alicyclic alcohol having from 4 to 20 carbon atoms.

The polymers having a basic nitrogen-containing part usually contain at least 0.01% by weight and preferably from 0.05 to 10% by weight of basic nitrogen.

The term "basic nitrogen" as used herein means nitrogen contained in secondary or tertiary amino groups, nitrogen contained in nitrogen-containing heterocyclic rings, and the like. The basic nitrogen-containing polymers are compounds having such basic nitrogen in their main or side chain.

If the basic nitrogen content is less than 0.01% by weight, satisfactory suspension state cannot be assured.

The above-described polymers having a basic nitrogen-containing part usually include copolymers comprising a monomer having basic nitrogen and other ethylenically unsaturated monomer; polymers comprising a basic nitrogen-containing monomer having reacted therewith a homo- or copolymer of an ethylenically unsaturated monomer, e.g., graft copolymers comprising a basic nitrogen-containing monomer having graft polymerized therewith a homo- or copolymer of an ethylenically unsaturated monomer; and modified products of these polymers.

Specific examples of the polymers having a basic nitrogen-containing part include copolymers of (meth)acrylic esters and basic nitrogen-containing monomers, such as 2-ethylhexyl acrylate/α-vinylpyridine copolymers, 2-ethylhexyl acrylate/β-vinylpyridine copolymers, 2-ethylhexyl acrylate/γ-vinylpyridine copolymers, n-octyl acrylate/γ-vinylpyridine copolymers, 2-ethylhexyl methacrylate/γ-vinylpyridine copolymers, 2-hydroxyethyl methacrylate/γ-vinylpyridine copolymers, n-octyl methacrylate/γ-vinylpyridine copolymers, 2-ethylhexyl acrylate/N,N-dimethylaminoethyl methacrylate copolymers, 2-hydroxyethyl acrylate/N,N-dimethylaminoethyl methacrylate copolymers, n-octyl acrylate/N,N-dimethylaminoethyl methacrylate copolymers, lauryl acrylate/N,N-dimethylaminoethyl methacrylate copolymers, 2-ethylhexyl methacrylate/N,N-dimethylaminoethyl methacrylate copolymers, 2-hydroxyethyl methacrylate/N,N-dimethylaminoethyl methacrylate copolymers, n-octyl methacrylate/N,N-dimethylaminoethyl methacrylate copolymers, etc.; copolymers of olefins and basic nitrogen-containing monomers, such as ethylene/N,N-dimethylaminoethyl methacrylate copolymers, ethylene/N,N-dibutylaminoethyl methacrylate copolymers, ethylene/acrylic acid/ethyleneimine copolymers, ethylene/vinyl acetate/ethyleneimine copolymers, etc.; polymers graft polymerized with basic nitrogen-containing monomers, such as ethylene/propylene/diene monomer copolymer (hereinafter abbreviated as EPDM)/α-vinylpyridine graft copolymers, EPDM/N,N-dimethylaminoethyl methacrylate graft copolymers, EPDM/N,N-dibutylaminoethyl methacrylate graft copolymers, etc.; and the like.

The EPDM graft polymerized with a basic nitrogen-containing monomer can be prepared by the process disclosed in Japanese Patent Application (OPI) No. 98513/82 (the term "OPI" as used herein means "unexamined published patent application").

The polymer having a carboxyl group-containing part generally includes polymers having an acid value of from 2 to 350 and preferably from 5 to 200. Polymers having an acid value less than 2 cannot maintain the suspension in a satisfactory state, and those having an acid value exceeding 350 require an excessive amount of an anionic polymerization catalyst.

Such polymers having a carboxyl group-containing part may be any of carboxyl group-containing polymers which are compatible with the organic suspending medium but usually include copolymers of a carboxyl group-containing monomer and other ethylenically unsaturated monomer; polymers comprising a carboxyl group-containing monomer having reacted therewith a homo- or copolymer of an ethylenically unsaturated monomer, e.g., graft copolymers comprising a carboxyl group-containing monomer having graft polymerized therewith a homo- or copolymer of an ethylenically unsaturated monomer; and modified products of these polymers.

Examples of the polymers having a carboxyl group-containing part which can preferably be used are described in U.S. Pat. No. 4,367,323. Specific examples thereof are ethylene/acrylic acid copolymers, ethylene/vinyl acetate copolymers modified with maleic anhydride, methyl methacrylate/methacrylic acid/2-ethylhexyl acrylate copolymers, a reaction product between maleic anhydride-modified liquid polybutadiene and 2-hydroxyethyl methacrylate, polybutadiene/butyl methacrylate/methacrylic acid copolymers, EPDM/acrylic acid/ethyl methacrylate graft copolymers, EPDM/acrylic acid/butyl methacrylate graft copolymers, EPDM/acrylic acid/2-ethylhexyl methacrylate graft copolymers, EPDM/methacrylic acid/ethyl methacrylate graft copolymers, EPDM/methacrylic acid/butyl methacrylate graft copolymers, EPDM/methacrylic acid/2-ethylhexyl methacrylate graft copolymers, EPDM/methacrylic acid/2-hydroxyethyl methacrylate graft copolymers, and the like.

Preferred of these are methyl methacrylate/methacrylic acid/2-ethylhexyl acrylate copolymers having a weight ratio of from 0/2/98 to 16/10/74; polybutadiene/butyl methacrylate/methacrylic acid graft copolymers; and EPDM/methacrylic acid/butyl methacrylate graft copolymers having an EPDM content of from 10 to 95% by weight.

The homo- or copolymers of an ethylenically unsaturated monomer graft polymerized with a carboxyl group-containing monomer can be prepared by the process described in U.S. Pat. No. 4,367,323.

According to the process of the present invention, the lactam is suspended in the aforesaid organic suspending medium using the above-described suspending agent, and the suspension is subjected to polymerization in the presence of an anionic polymerization catalyst and a polymer activator.

Any of known anionic polymerization catalysts can be used for polymerization of the lactam according to the present invention. Specific examples of usable catalysts include alkali metals or alkaline earth metals or their hydrides, oxides, carbonates, or alkoxides, Grignard reagents, and reaction products between these metals or metal compounds with lactams, such as sodium, potassium, chloromagnesium, bromomagnesium, or iodomagnesium salts of ε-caprolactam. Preferred among them are the reaction products between metal compounds and lactams, such as sodium, bromomagnesium, or iodomagnesium salts of ε-caprolactam and sodium, bromomagnesium, or iodomagnesium salts of laurolactam.

The polymer activator which can be used in the present invention is a polymer having a functional group for lactam polymerization at a part or all of the terminals of its polymer chain and is soluble in the lactam to be polymerized. The polymer activator serves as an accelerator for lactam polymerization and also as a comonomer to constitute a part of the resulting block copolymer. Therefore, since the properties possessed by the polymer chain of the activator are imparted to the block copolymer, the polymer activator to be used is selected appropriately depending on the end use of the block copolymer.

Examples of the polymer activator include polyoxyalkylenes, polydienes, aliphatic polyesters, polysiloxanes, and copolymer chains thereof. These polymer chains have a molecular weight of from about 500 to 50,000 and preferably from about 500 to 10,000. The functional group incorporated into the polymer chain is selected from an isocyanato group, a carbamoyl lactam group, an acid chloride group, an acyl lactam group, a hydroxycarbonyl lactam group, and a combination thereof.

Processes for preparing these polymer activators are conventional. For example, a polymer activator having an isocyanato group at the terminal is well known as a prepolymer of a soft urethane. A polymer activator having a carbamoyl lactam group at the terminal can be prepared by the process disclosed in U.S. Pat. No. 4,540,515. A polymer activator having an acid chloride or acyl lactam at the terminal can be prepared by reacting a hydrocarbon, polyester, polysiloxane, or polyether having a plurality of hydroxyl groups with a hydrocarbon having a plurality of acid halide groups, as described in European Pat. No. 67,693. A polymer activator having a hydroxycarbonyl lactam group at the terminal can be prepared by reacting a polyoxyalkylene having a plurality of hydroxyl groups at the terminals with N-chlorocarbonyl lactam, as described in European Pat. No. 147,051.

The activator thus prepared may not be necessarily isolated for use in the present invention. For example, it is possible to successively carry out the reaction between an alcoholic hydroxyl group-terminated polymer and a diacyl lactam compound to obtain an acyl lactam group-terminated activator as an intermediate and the anionic polymerization reaction of a lactam in the same reaction system.

The process for producing the polyamide block copolymer according to the present invention will be explained below in detail.

The organic suspending medium is used in an amount of from 50 to 2,000 parts by weight and preferably from 100 to 1,000 parts by weight based on 100 parts by weight of the total amount of the lactam, the anionic polymerization catalyst of lactam, and the polymer activator. When the amount of the organic suspending medium is less than 50 parts by weight, the suspension state becomes extremely unstable, while amounts exceeding 2,000 parts by weight result in nothing but dilution of the suspension.

The suspending agent is used in an amount of from 0.01 to 20 parts by weight and preferably from 0.05 to 10 parts by weight based on 100 parts by weight of the total amount of the lactam, the anionic polymerization catalyst of lactam, and the polymer activator. If the amount of the suspending agent is less than 0.01 part by weight, suspension stability is deteriorated, failing to maintain a satisfactory suspension state during the polymerization. More than 20 parts by weight of the suspending agent tends to inhibit polymerization, resulting in reduction of yield, and also excessively increases the viscosity of the suspension. As a result, a great load of stirring would be required, and the working-up treatment after the polymerization becomes complicated.

The amount of the anionic polymerization catalyst ranges from 0.01 to 20 parts by weight and preferably from 0.05 to 10 parts by weight based on 100 parts by weight of the total amount of the lactam, the anionic polymerization catalyst of lactam, and the polymer activator. When it is less than 0.01 part by weight, the yield is low due to incomplete polymerization. Amounts exceeding 20 parts by weight are uneconomical.

The amount of the polymer activator to be used ranges from 0.1 to 80 parts by weight and preferably from 0.5 to 70 parts by weight based on 100 parts by weight of the total amount of the lactam, the anionic polymerization catalyst of lactam, and the polymer activator. When it is less than 0.1 part by weight, not only the anionic polymerization is much retarded to extend the time required for the production of the block copolymer but also characteristics expected for the block copolymer are not manifested.

A suitable amount of the polymer activator to be used can be determined appropriately depending on the physical properties required for the block copolymer. In general, the greater the amount of the polymer activator, the more pronounced the properties arising from the polymer activator, thus proportionally weakening the polyamide properties.

The anionic polymerization of the lactam is carried out under substantially water-free conditions because a water content causes decomposition of the anionic polymerization catalyst, leading to reduction in catalytic activity. It is desirable that contact of the polymerization system with oxygen be avoided as possible from the standpoint of prevention of coloration of the resulting polymer.

The suspension polymerization on a large scale is carried out in a reaction vessel equipped with a stirrer. In this case, an organic suspending medium and a suspending agent are placed in the reaction vessel and stirred beforehand. A component mainly comprising a lactam and an anionic polymerization catalyst of lactam and a component mainly comprising a polymer activator are separately prepared. Prescribed amounts of these two components are mixed, and the mixture is introduced to the reaction vessel and suspended in the organic suspending medium therein. The temperature is then elevated to effect polymerization.

Mixing of prescribed amounts of the components is preferably effected by introducing each of them to a continuous fluid mixing apparatus, e.g., a static mixer, a dynamic mixer, an impact mixer, etc., by means of a metering pump, e.g., a gear pump, a plunger pump, a piston pump, a bellows pump, a tube pump, etc., and uniformly mixing them in a relatively short period of time.

In order to keep the fluidity of the components, it is preferable to preheat the metering pump, the fluid mixing apparatus, pipes for connecting these parts, and valves, etc.

The reaction is performed at a temperature of from the melting point of the lactam up to 200° C. at atmospheric pressure or under elevated pressure. If the reaction temperature is lower than the melting point of the lactam, the lactam is crystallized, giving rise to a bar to completion of polymerization. Temperatures higher than 200° C. cause significant coloration of the resulting polymer.

The reaction pressure is determined spontaneously on setting the kind of the organic suspending medium and the reaction temperature. If desired, an inert gas may be introduced to slightly pressurize. The polymerization reaction completes in a relatively short period of time within 3 hours.

The produced polyamide block copolymer is separated from the suspending medium by sedimentation, filtration, centrifugation, or the like technique, followed by working-up procedures well known for the suspension polymerization, such as washing, drying, etc.

If desired, the polyamide block copolymer according to the present invention may contain additives, such as stabilizers, pigments, dyes, fillers, and the like.

Examples of the stabilizers to be used include phenolic stabilizers, e.g., 3,5-di-t-butyl-p-hydroxytoluene, stearyl 3-(3,5-di-t-butyl-4-hydroxyphenyl)propionate, 2-(3,5-di-t-butyl-4-hydroxyphenyl)amino-4,6-bis(octylthio)-1,3,5-triazole, 2,2-methylenebis(6-t-butyl-p-cresol), 1,6-hexamethylenebis[3-(3,5-di-t-butyl-4-hydroxyphenyl)propionamide], mono-0-acryloxy-2,2-methylenebis(6-t-butyl-p-cresol), etc.; phosphoric type stabilizers, e.g., tridecyl phosphite, triphenyl phosphite, tri(nonylphenyl)phosphite, etc.; amine type stabilizers, e.g., diphenylamine, 4,4'-bis(1,1,3,3-tetramethylbutyl)-diphenylamine, styrenated diphenylamine, etc.; sulfur type stabilizers, e.g., dilaurylthio dipropionate, distearylthio dipropionate, pentaerythritol tetrakis(3-dodecylthiopropionate), 3,9-bis(2-dodecylthioethyl)-2,4,8,10-tetraoxaspiro[5,5]undecane, etc.; benzophenone type light absorbers; benzotriazole type light absorbers, hindered amine light stabilizers, and the like.

Examples of the pigments which can be used include inorganic pigments, e.g., white lead, vermilion, cobalt oxide, titanium black, etc., and organic pigments, e.g., insoluble azo pigments, Phthalocyanine Blue, color lakes, etc. Examples of the usable dyes are disperse dyes, cationic dyes, basic dyes, acid dyes, reactive dyes, direct dyes, sulfur dyes, vat dyes, azoic dyes, mordant dyes, complex dyes, organic solvent-soluble dyes, and pigment resin colors, and the like. The fillers to be used include carbon black, talc, titania powders, etc.

These additives may be previously incorporated into the reactive components or may be added to the polymerization system. They may also be added to the resulting polyamide in a molten state for molding.

According to the process of the present invention, granular or powdery polyamide block copolymers containing no masses or fine particles can be produced. The resulting polyamide block copolymers are easy to handle and suitable as produced for use as cosmetics, coatings, etc. Since the polyamide block copolymers can be plasticized, they can be molded into a desired shape by commonly employed molding methods, such as injection molding, extrusion molding, blow molding, and the like.

Further, the components constituting the block copolymer can be altered easily so as to show various desired properties, such as impact strength, flexibility, stiffness, and the like, that are not possessed by homopolymers, and the properties to be imparted may be controlled within a certain range.

The present invention will now be explained in greater detail by way of the following examples, but it should be understood that the present invention is not limited thereto. In these examples, all the percents are by weight unless otherwise indicated.

EXAMPLE 1

(1) Synthesis of Suspending Agent

In a 500 ml-volume cylindrical flask were charged 300 g of water, 13.32 g of sodium chloride, and 0.333 g of polyvinyl alcohol ("PVA-217", produced by Kuraray Co., Ltd.) to prepare a homogeneous solution. After nitrogen had been bubbled through the solution for 30 minutes, the solution was heated to 60° C.

Separately, 0.015 g of t-dodecylmercaptan, 62 g of 2-ethylhexyl acrylate, 4.66 g of N,N-dimethylaminoethyl methacrylate, and 0.333 g of azobisisobutyronitrile were mixed, followed by bubbling nitrogen therethrough for 30 minutes.

The resulting mixture was poured all at once into the above-prepared aqueous solution kept at 60° C. while stirring at 550 rpm. The stirring at 550 rpm was continued at 60° C. for 4 hours and then at 70° C. for 2 hours to effect polymerization. The resulting polymer was washed with water and dried to obtain 60 g of a 2-ethylhexyl acrylate/N,N-dimethylaminoethyl methacrylate copolymer.

(2) Synthesis of Polymer Activator

In a nitrogen-purged 500 ml-volume round flask equipped with a stirrer were charged 300 g of polyoxytetramethylene di-ol (number average molecular weight: 3,000) and 35 g of N-chlorocarbonyl caprolactam, and the mixture was allowed to react at 70° C. for 10 hours and then at 100° C. for an additional 5 hours while reducing the pressure with a vacuum pump connected to an alkali stripping column. There was obtained 315 g of a liquid polymer activator.

(3) Suspension Polymerization

In a 500 ml-volume flask were charged 2 g of the suspending agent prepared in (1) above and 300 g of isooctane. The mixture was heated to 98° C., followed by blowing dry nitrogen therethrough to evaporate about 30 g of the isooctane to make the system substantially water-free.

Separately, a mixture of 49.4 g of the polymer activator prepared in (2) above (carbonyl caprolactam-terminated polytetramethylene glycol; number average molecular weight: about 3130) and 0.25 g of Irganox ® 1098 (produced by Ciba-Geigy AG) was kept at 80° C. A mixture of 48.6 g of anhydrous ε-caprolactam and 2 g of ε-caprolactam magnesium iodide was kept at 80° C. in a separate container.

Both the mixtures were rapidly mixed with shaking at 80° C., and the resulting mixture was poured into the above-prepared isooctane solution kept at 98° C., followed by stirring at 500 rpm to effect suspension polymerization. The polymerization completed in one hour, and the resulting slurry was filtered, washed with water, and dried to obtain a nylon-6/polyoxytetramethylene block copolymer powder in a yield of 90%.

The powder was found to have a polyoxytetramethylene content of 38% by means of an NMR analysis (measured using tetramethylsilane as a standard in $CF_3CO_2H$ with "Hitachi 90H" manufactured by Hitachi, Ltd.) and an average particles size of 634 μm.

EXAMPLE 2

(1) Synthesis of Suspending Agent

In a 300 ml-flask were charged 28 g of EPDM ("Esprene ® 501A", produced by Sumitomo Chemical Co., Ltd.) and 170 g of isooctane. After bubbling nitrogen therethrough for 30 minutes, the mixture was heated to 68° C., followed by stirring for 3 hours to completely dissolve EPDM. After the solution had been once cooled to room temperature, 2 g of N,N-dimethylaminoethyl methacrylate and 0.3 g of azobisisobutyronitrile were added thereto. Nitrogen gas was bubbled through the resulting mixture for 30 minutes, and the mixture was heated at 67° C. for 7 hours while stirring to obtain an isooctane solution of an EPDM/N,N-dimethylaminoethyl methacrylate graft copolymer.

(2) Suspension Polymerization

Suspension polymerization was carried out in the same manner as described in Example 1-(3) except that 13.3 g of the isooctane solution of the EPDM/N,N-dimethylaminoethyl methacrylate graft copolymer as prepared above and 286 g of isooctane were charged in a 500 ml-volume flask, to obtain a nylon-6/polyoxytetramethylene block copolymer powder in a yield of 88%.

The powder was found to have a polyoxytetramethylene content of 35.6% by an NMR analysis and an average particle size of 750 μm.

EXAMPLE 3

(1) Synthesis of Suspending Agent

In a 200 ml-volume flask were charged 11.1 g of EPDM ("Esprene ® 501A") and 85 g of isooctane, followed by bubbling nitrogen therethrough for 30 minutes. The mixture was heated to 68° C. and stirred for 3 hours to completely dissolve EPDM. After the solution had been once cooled to room temperature, 1.95 g of ethyl methacrylate, 1.95 g of methacrylic acid, and 0.15 g of azobisisobutyronitrile were added thereto.

After nitrogen had been bubbled through the mixture for 30 minutes, the mixture was heated at 67° C. for 7 hours under stirring to obtain an isooctane solution of an EPDM/ethyl methacrylate/methacrylic acid graft copolymer having an acid value of 85.

(2) Suspension Polymerization

In a 500 ml-volume flask were charged 13.3 g of the isooctane solution of the EPDM/ethyl methacrylate/methacrylic acid graft copolymer as prepared in (1) above and 286 g of isooctane, and the system was made substantially water-free in the same manner as in Example 1-(3).

Separately, a mixture of 49.4 g of carbonyl lactam-terminated polyoxytetramethylene di-ol (number average molecular weight: about 3130) and 0.25 g of Iraganox ® 1098 was kept in a container at 80° C. In another container was placed a mixture of 47.5 g of anhydrous ε-caprolactam and 3.1 g of ε-caprolactam magnesium iodide and kept at 80° C.

Both the mixtures were rapidly mixed with shaking at 80° C., and the resulting mixture was poured into the above-prepared isooctane solution kept at 98° C., followed by stirring at 550 rpm to effect suspension polymerization.

The polymerization reaction was completed in one hour, and the resulting slurry was filtered, washed with water, and dried to obtain a nylon-6/polyoxytetramethylene block copolymer powder in a yield of 90%.

The powder was found to have a polyoxytetramethylene content of 36% by an NMR analysis and an average particle size of 462 μm.

COMPARATIVE EXAMPLE 1

(1) Synthesis of Activator Adipolybiscaprolactam

In a 1 l-volume round flask were charged 160 g of pyridine and 452 g of ε-caprolactam, and the mixture was stirred while heating on a water bath heated at 70° C. to make a homogeneous solution.

To the solution was added dropwise 183 g of adipic chloride (produced by Tokyo Kasei K.K.) over 1 hour while heating on a water bath at 70° C. After the dropwise addition, the stirring under heating on the water bath was continued for an additional 2 hours.

The reaction mixture was poured into ice-water while stirring, and the precipitated solid was collected, washed with water, and dried. Recrystallization from hexane gave about 300 g of adipolybiscaprolactam as a white needle-like crystal.

(2) Suspension Polymerization

In a 500 ml-volume flask were charged 2 g of the 2-ethylhexyl acrylate/N,N-dimethylaminoethyl methacrylate copolymer as prepared in Example 1-(1) and 300 g of isooctane to form a solution. The resulting solution was heated to 98° C., and dry nitrogen was bubbled therethrough to evaporate off about 30 g of the isooctane to make the system substantially water-free.

Separately, a mixture of 49 g of anhydrous ε-caprolactam and 1 g of adipolybiscaprolactam as prepared in (1) above was maintained at 80° C. In another container, 48 g of anhydrous ε-caprolactam and 2 g of caprolactam magnesium bromide were mixed and kept at 80° C.

Both the mixtures were rapidly mixed with shaking at 80° C., and the mixture was poured into the above-prepared isooctane solution kept at 98° C., followed by stirring at 550 rpm to effect suspension polymerization. The polymerization reaction completed in one hour, and the produced nylon-6 resin powder was collected by filtration and dried. The powder had an average particle size of 444 μm, and the yield was 92%.

COMPARATIVE EXAMPLE 2

Suspension polymerization was carried out in the same manner as in Example 1 except for replacing 2 g of the 2-ethylhexyl acrylate/N,N-dimethylaminoethyl methacrylate copolymer as used in Example 1 with 2 g of sorbitan monostearate ("Span ® 60", produced by Kao Corporation). However, the dispersed particles in the reaction system began to agglomerate after 5 minutes from the start of the reaction and completely agglomerated after 6 minutes.

EXAMPLE 4

(1) Synthesis of Suspending Agent:

An isooctane solution of an EPDM/N,N-dimethylaminoethyl methacrylate/methyl methacrylate graft copolymer was prepared in the same manner as in Example 2-(1) except for replacing 2 g of the N,N-dimethylaminoethyl methacrylate with 1.14 g of N,N-dimethylaminoethyl methacrylate and 0.86 g of methyl methacrylate.

(2) Synthesis of Polymer Activator

In a nitrogen-purged 1 l-volume round flask equipped with a stirrer were charged 500 g of polyoxypropylene di-ol (number average molecular weight: 2,000) and 70 g of N-chlorocarbonyl caprolactam. The mixture was allowed to react at 80° C. for 7 hours and then at 100° C. for an additional 5 hours while reducing the pressure with a vacuum pump connected to an alkali stripping column. There was obtained 545 g of a liquid polymer activator.

(3) Suspension Polymerization

In a 500 ml-volume flask were charged 6.5 g of the isooctane solution of the EPDM/N,N-dimethylaminoethyl methacrylate/methyl methacrylate graft copolymer as prepared above and 140 g of isooctane, and the system was made substantially water-free in the same manner as in Example 1-(3).

Separately, 57 g of the polymer activator as prepared in (2) above (carbonyl lactam-terminated polyoxypropylene; number average molecular weight: about 2,280) and 0.1 g of 4,4'-(α,α'-dimethylbenzyl)diphenylamine as an anti-oxidant were mixed and kept at 80° C. In another container, 42.7 g of anhydrous ε-caprolactam and 0.3 g of sodium hydride were mixed and kept at 80° C.

Thereafter, suspension polymerization was carried out in the same manner as in Example 1-(3) to obtain a nylon-6/polyoxypropylene block copolymer powder in a yield of 80%. The resulting powder was found to have a polyoxypropylene content of 51% by an NMR analysis and an average particle size of 530 μm.

EXAMPLE 5

(1) Synthesis of Polymer Activator

In a nitrogen-purged 200 ml-volume round flask equipped with a stirrer were charged 100 g of trivalent star-shaped polyoxypropylene tri-ol and 17.7 g of N-chlorocarbonyl caprolactam, and the mixture was allowed to react at 80° C. for 10 hours. The reaction was further continued at 100° C. for an additional 5 hours while reducing the pressure with a vacuum pump. There was obtained 113 g of a liquid polymer activator.

(2) Suspension Polymerization

In a 500 ml-volume flask were charged 13.3 g of the isooctane solution of the EPDM/N,N-dimethylaminoethyl methacrylate/methyl methacrylate graft copolymer as prepared in Example 4 and 286 g of isooctane, and the system was made substantially water-free in the same manner as in Example 1.

Separately, 52.5 g of the polymer activator as above obtained (carbonyl lactam-terminated star-shaped polyoxypropylene; number average molecular weight: about 3,500) and 0.1 g of 4,4'-(α,α'-dimethylbenzyl)diphenylamine were mixed and kept at 80° C. In another container, 47.2 g of anhydrous caprolactam, 0.3 g of sodium hydride, and 0.1 g of a 15% toluene solution of triethylaluminum were mixed and kept at 80° C.

Thereafter, suspension polymerization was carried out in the same manner as in Example 1-(3) to obtain a nylon-6/polyoxypropylene block copolymer powder in a yield of 85%. The resulting powder was found to have a polyoxypropylene content of 46% by an NMR analysis and an average particle size of 210 μm.

EXAMPLE 6

(1) Synthesis of Polymer Activator

A hundred grams of polybutadiene glycol ("R-45 HT grade", produced by Idemitsu Petrochemical Co., Ltd.; number average molecular weight: about 2,200) was charged in a 300 ml-volume three-necked round flask, and the inner pressure was reduced to 10 mmHg by means of a vacuum pump while maintaining at 80° C.

Then, 17.17 g of N-chlorocarbonyl caprolactam (purity: 93%) was added dropwise thereto from a dropping funnel over a period of 30 minutes while stirring. After the mixture had been aged for an additional 4.5 hours while stirring at 80° C. and at a pressure of 10 mmHg, any remaining hydrogen chloride was removed by further reducing the pressure, to thereby obtain 112.6 g of hydroxycarbonyl caprolactam-terminated polybutadiene.

(2) Suspension Polymerization

A mixture of 50.7 g of the above-prepared polymer activator and 0.2 g of 4,4'-(α,α'-dimethylbenzyl)diphenylamine was prepared and kept at 80° C. Separately, 47.3 g of anhydrous ε-caprolactam and 2 g of ε-caprolactam magnesium iodide were mixed and kept at 80° C.

Suspension polymerization was carried out using these mixtures in the same manner as in Example 1-(3) to obtain a polybutadiene/nylon-6 block copolymer powder in a yield of 78%. The resulting powder was found to have a polybutadiene content of 40% by an NMR analysis and an average particle size of 140 μm.

EXAMPLE 7

(1) Synthesis of Polymer Activator

In a nitrogen-purged 200 ml-volume round flask equipped with a stirrer were charged 100 g of poly-ε-caprolactone having two hydroxyl groups at the terminals ("Placcel® 230", produced by Daicel Chemical Industries, Ltd.; number average molecular weight: 2,930) and 12.6 g of N-chlorocarbonyl caprolactam. The mixture was allowed to react at 70° C. for 10 hours and then at 100° C. for 5 hours while reducing the pressure with a vacuum pump. There was obtained 109 g of a waxy hydroxycarbonyl caprolactam-terminated ε-caprolactone having a number average molecular weight of about 3,160.

(2) Suspension Polymerization

A poly(ε-caprolactone)/nylon-6 block copolymer powder was prepared in a yield of 91% in the same manner as in Example 1-(3) except for using a mixture of 49.4 g of the above-prepared polymer activator and 0.1 g of 4,4'-(α,α'-dimethylbenzyl)diphenylamine kept at 80° C. The resulting powder was found to have a poly(ε-caprolactone) content of 41% by an NMR analysis and contain coarse grains having a diameter of 3 mm or greater in a proportion of about 20%.

EXAMPLE 8

(1) Synthesis of Polymer Activator

In a 200 ml-volume three-necked round flask was charged 100 g of polyoxytetramethylene di-ol (number average molecular weight: 1,975) and stirred in a nitrogen stream while heating at 40° C.

To the flask were added 0.01 g of dibutyltin dilaurate and then 17.0 g of hexamethylene diisocyanate to effect reaction with the polyoxytetramethylene di-ol. After stirring for 2 hours, 12.0 g of dry ε-caprolactam was added to the reaction mixture, and the inner temperature was raised up to 80° C., at which the reaction was continued for an additional 2 hours. There was obtained 129 g of carbamoyl caprolactam-terminated polyoxytetramethylene.

(2) Suspension Polymerization

Fifty-eight grams of the above-prepared polymer activator and 0.1 g of 4,4'-(α,α'-dimethylbenzyl)diphenylamine were mixed and maintained at 80° C. Separately, 41.7 g of anhydrous ε-caprolactam and 0.3 g of sodium hydride were mixed and kept at 80° C.

Suspension polymerization was carried out in the same manner as in Example 4 except for using the above-prepared mixtures, to obtain a polyoxytetramethylene/nylon-6 block copolymer powder in a yield of 78%. The resulting powder was found to have a polyoxytetramethylene content of 42% by an NMR analysis and an average particle size of 620 μm.

EXAMPLE 9

Forty-five grams of polyoxypropylene di-ol (number average molecular weight: 2,000) was mixed with 10.0 g of adipolybiscaprolactam obtained by reacting ε-caprolactam and adipic chloride, and the mixture was kept at 80° C. Separately, 43.0 g of anhydrous ε-caprolactam and 2 g of ε-caprolactam magnesium bromide were mixed and kept at 80° C.

Suspension polymerization was carried out by using these mixtures in the same manner as in Example 1 to obtain a polyoxypropylene/nylon-6 block copolymer in a yield of 73%. The resulting powder was found to have a polyoxypropylene content of 40% by an NMR analysis.

EXAMPLE 10

In a 5 l-volume jacketed reaction vessel equipped with an anchor agitator were charged 20 g of the suspending agent prepared in Example 1-(1) and 3 l of isooctane. The mixture was heated to 98° C., and nitrogen gas was blown therein to evaporate about 0.2 l of the isooctane, followed by keeping warm under stirring.

Separately, 486 g of ε-caprolactam and 20 g of ε-caprolactam magnesium iodide were placed in a 2 l-volume container equipped with a stirrer, and the mixture was heated up to 80° C. to form a homogeneous solution. In another 2 l-volume container equipped with a stirrer were placed 494 g of the carbonyl caprolactam-terminated polyoxytetramethylene prepared in Example 1 and 2.5 g of an antioxidant ("Naugard ® 445", produced by Uniroyal, Inc.), followed by mixing at 80° C.

The two mixtures were fed separately but simultaneously to a static mixer (length: 150 mm; diameter: 10 mm; element: 18 units; linear velocity: 5.4 to 16.7 cm/sec) each at a feed rate of 100 ml/min by means of a respective jacketed gear pump (maximum flow rate: 1 l/min; pressure of discharge: 4 kg/cm²; power: 0.4 kW), and the mixture in the static mixer was forwarded to the reaction vessel containing the isooctane solution to effect polymerization.

After about 10 minutes from the start of the polymerization, solid particles were formed. After 1 hour, the temperature was decreased, and the stirring was stopped. The slurry was taken out, filtered, washed with water, and dried to obtain about 940 g of a polyoxytetramethylene/nylon-6 block copolymer having an average particle size of 533 μm.

EXAMPLE 11

In the same reaction vessel as used in Example 10 were charged 133 g of the isooctane solution of the suspending agent as prepared in Example 2-(1) and 3 l of liquid paraffin. The inner temperature was raised to 160° C., and nitrogen gas was blown thereinto to make the system substantially water-free. The system was maintained at that temperature.

In the same container as used in Example 10 was placed 498 g of ω-dodecanolactam and heated to 160° C. to melt, and 3 ml of a 6% methanolic solution of sodium methoxide was added thereto. Separately, 438 g of the carbonyl lactam-terminated polyoxytetramethylene, 62 g of ω-dodecanolactam, and 2.5 g of Naugard ® 445 was placed in another container and mixed while stirring at 160° C. to form a homogeneous solution.

The above-prepared two mixtures were fed separately but simultaneously to the reaction vessel containing the isooctane solution while being mixed together at a flow rate of 500 ml/min using the same gear pump and static mixer as used in Example 10.

About 2 minutes later, solid particles were observed in the reaction mixture. After 30 minutes, the temperature was decreased, and the stirring was stopped. The slurry was taken out, filtered, washed successively with hexane and methanol, and dried to obtain 730 g of a polyoxytetramethylene/nylon-12 block copolymer powder.

REFERENCE EXAMPLE

Fifty-eight grams of each of the polyamide powder as prepared in Comparative Example 1 and the polyether polyamide block copolymer powders as prepared in Examples 1, 4, and 7 were mixed with 0.15 g of Irganox ® 1098, 0.15 g of Mark ® PEP-8 (produced by Adeka Argus Chemical Co., Ltd.), and 0.15 g of Sumilizer ® TL (produced by Sumitomo Chemical Co., Ltd.) as stabilizers in a Laboplasto Mill manufactured by Brabender Co. at a temperature of 240° C.

The resulting compound was pressed at 225° C. under a pressure of 100 kg/cm² to prepare a sheet having a thickness of 3 mm. Test specimens were prepared from the resulting sheet, and evaluations were made on tensile strength and impact strength in accordance with ASTM-D638 and ASTM-D256, respectively. The results of the evaluations are shown in Table 1 below.

TABLE 1

| | Tensile Strength at Break (kg/cm²) | Elongation at Break (%) | Izot Strength (notched) (kg · cm/cm²) |
|---|---|---|---|
| Comparative Example 1 | 600 | 35 | 8 |
| Example 1 | 280 | 340 | no break |
| Example 4 | 210 | 380 | " |
| Example 7 | 270 | 360 | " |

While the invention has been described in detail and with reference to specific embodiments thereof, it will be apparent to one skilled in the art that various changes and modifications can be made therein without departing from the spirit and scope thereof.

What is claimed is:

1. A process for producing a polyamide block copolymer which comprises suspension polymerizing a lactam in an organic suspending medium containing a suspending agent in the presence of an anionic polymerization catalyst and a polymer activator, wherein:
   (1) said organic suspending medium is a medium in which said lactam is insoluble or sparingly soluble and which causes phase separation when mixed with an approximately equivalent amount of said lactam at temperatures above the melting point of said lactam wherein said organic suspending medium is used in an amount of from 50 to 2,000 parts by weight based on 100 parts by weight of the total amount of said lactam, said anionic polymerization catalyst, and said polymer activator;
   (2) said suspending agent is a polymer having separate compatibility parts with said lactam and said organic suspending medium, respectively and having a molecular weight of from 500 to 10,000,000 wherein said suspending agent is used in an amount of from 0.01 to 20 parts by weight based on 100 parts by weight of the total amount of said lactam, said anionic polymerization catalyst, and said polymer activator;
   (3) said anionic polymerization catalyst is used in an amount of from 0.01 to 20 parts by weight based on 100 parts by weight of the total amount of said lactam, said anionic polymerization catalyst, and said polymer activator; and
   (4) said polymer activator is a polymer which has a functional group for lactam polymerization at a part or all of the terminals of the polymer chain thereof and which is soluble in said lactam to be polymerized wherein said polymer activator is used in an amount of from 0.1 to 80 parts by weight based on 100 parts by weight of the total amount of said lactam, said anionic polymerization catalyst, and said polymer activator.

2. A process as in claim 1, wherein said organic suspending medium is an aliphatic or alicyclic hydrocarbon having from 6 to 16 carbon atoms.

3. A process as in claim 1, wherein said suspending agent is a polymer which (1) has, as the compatibility part with said lactam, from 0.05 to 10% by weight of basic nitrogen or a carboxyl group with an acid value being from 2 to 350 and which (2) has, as the compatibility part with said organic suspending medium, a repeating unit part selected from the group consisting of (a) an olefin, (b) a diene, and (c) an acrylic or methacrylic acid ester with an aliphatic or alicyclic alcohol having from 4 to 20 carbon atoms.

4. A process as in claim 3, wherein said suspending agent is a copolymer comprising methyl methacrylate, methacrylic acid, and 2-ethylhexyl acrylate at a polymerization ratio of from 0/2/98 to 16/10/74, a polybutadiene/butyl methacrylate/methacrylic acid graft copolymer, or an ethylene/propylene/diene copolymer/methacrylic acid/butyl methacrylate graft copolymer having an ethylene/propylene/diene copolymer content of from 10 to 95% by weight.

5. A process as in claim 1, wherein said polymer activator is a polymer having a polymer chain selected from the group consisting of a polyoxyalkylene, a polydiene, an aliphatic polyester, a polysiloxane, and a copolymer chain thereof, at least one end of which is terminated with at least one functional group selected from the group consisting of an isocyanato group, a carbamoyl lactam group, an acid chloride group, an acyl lactam group, and a hydroxycarbonyl lactam group.

* * * * *